United States Patent [19]

Kamner

[11] 4,019,626
[45] Apr. 26, 1977

[54] SHAKER CONVEYOR AND DRIVE MECHANISM THEREFOR

[75] Inventor: Haim J. Kamner, Palatine, Ill.

[73] Assignee: Goodman Equipment Corporation, Chicago, Ill.

[22] Filed: Feb. 27, 1975

[21] Appl. No.: 553,437

[52] U.S. Cl. .............................. 198/750; 198/500; 198/766; 184/7 R; 184/43

[51] Int. Cl.² ......................................... B65G 25/04

[58] Field of Search ..... 198/110, 220 BA, 220 DA, 198/750, 766, 500; 74/25, 44, 45, 829; 184/1 E, 7 R, 6.6, 27 E, 32, 43, 6.8, 6.16; 417/500; 92/138

[56] References Cited

UNITED STATES PATENTS

| 1,197,133 | 9/1916 | Lawry | 198/220 DA |
| 2,142,217 | 1/1939 | Sloane | 198/220 DA |
| 3,012,654 | 12/1961 | Allen et al. | 198/220 DA |

Primary Examiner—Johnny D. Cherry
Assistant Examiner—Joseph E. Valenza
Attorney, Agent, or Firm—Fitch, Even, Tabin & Luedeka

[57] ABSTRACT

A drive mechanism for a shaker conveyor is disclosed in which a drive unit is supported on a mounting beam and has an output crank connected through a pull rod to a conveyor trough such that the puller rod undergoes movement in a plane substantially parallel to the direction of movement of the trough. The drive unit is rotatable relative to the mounting beam in a manner to selectively vary the acceleration characteristics of the conveyor trough, and has a self-contained internal lubricating system which provides improved quiet operation.

19 Claims, 10 Drawing Figures

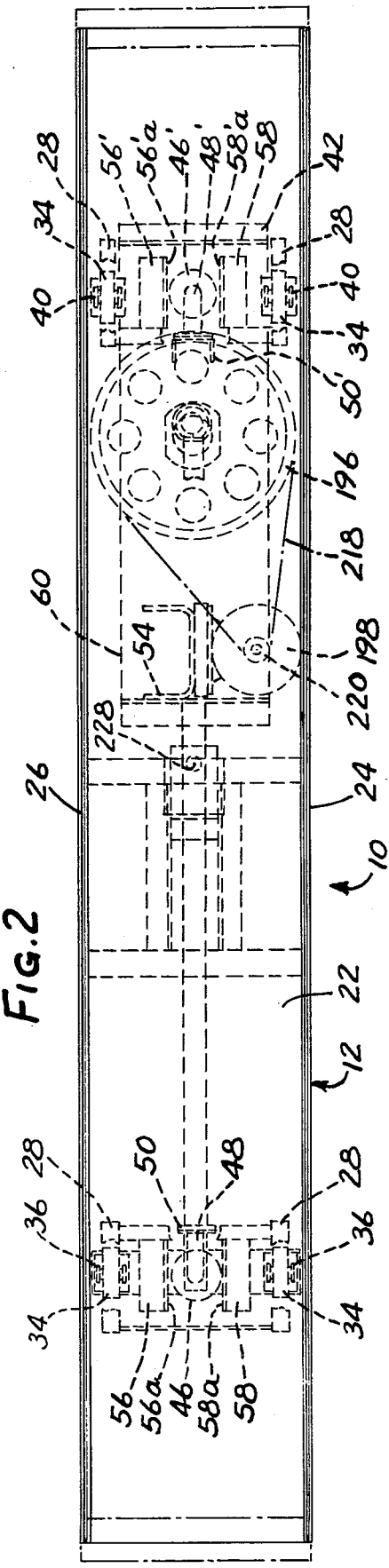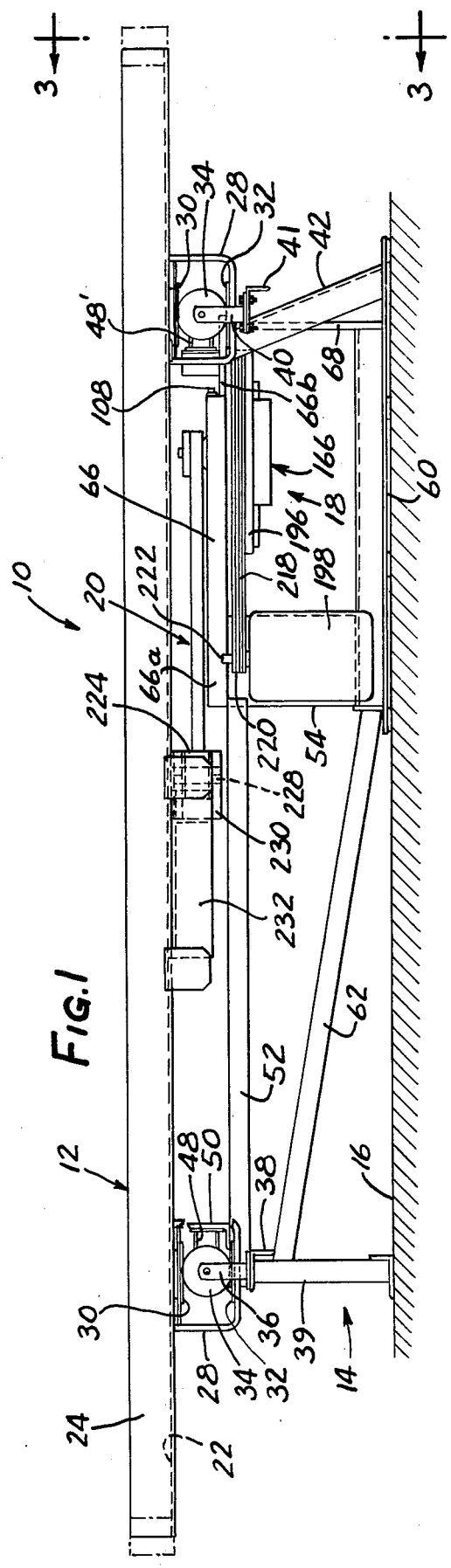

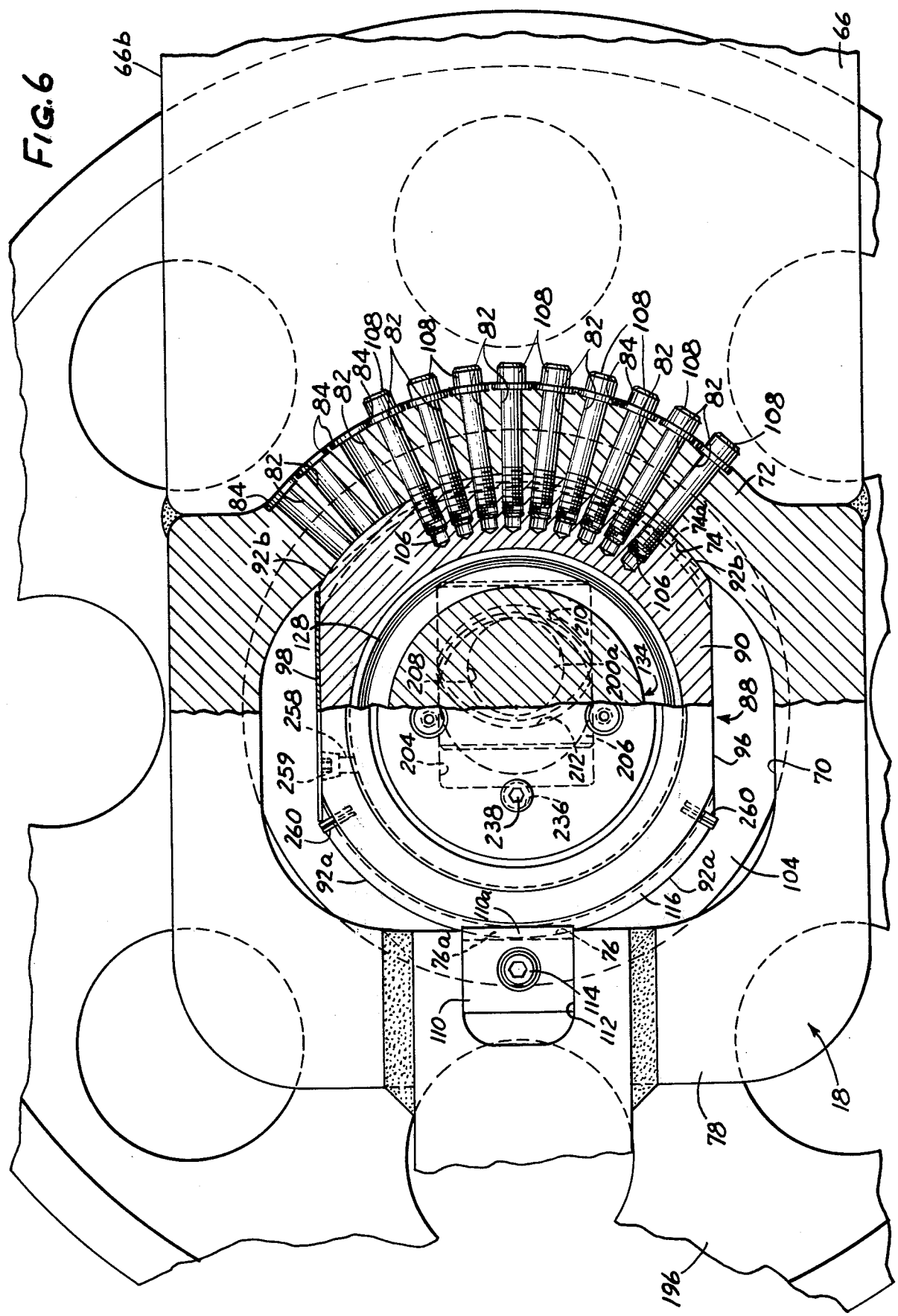

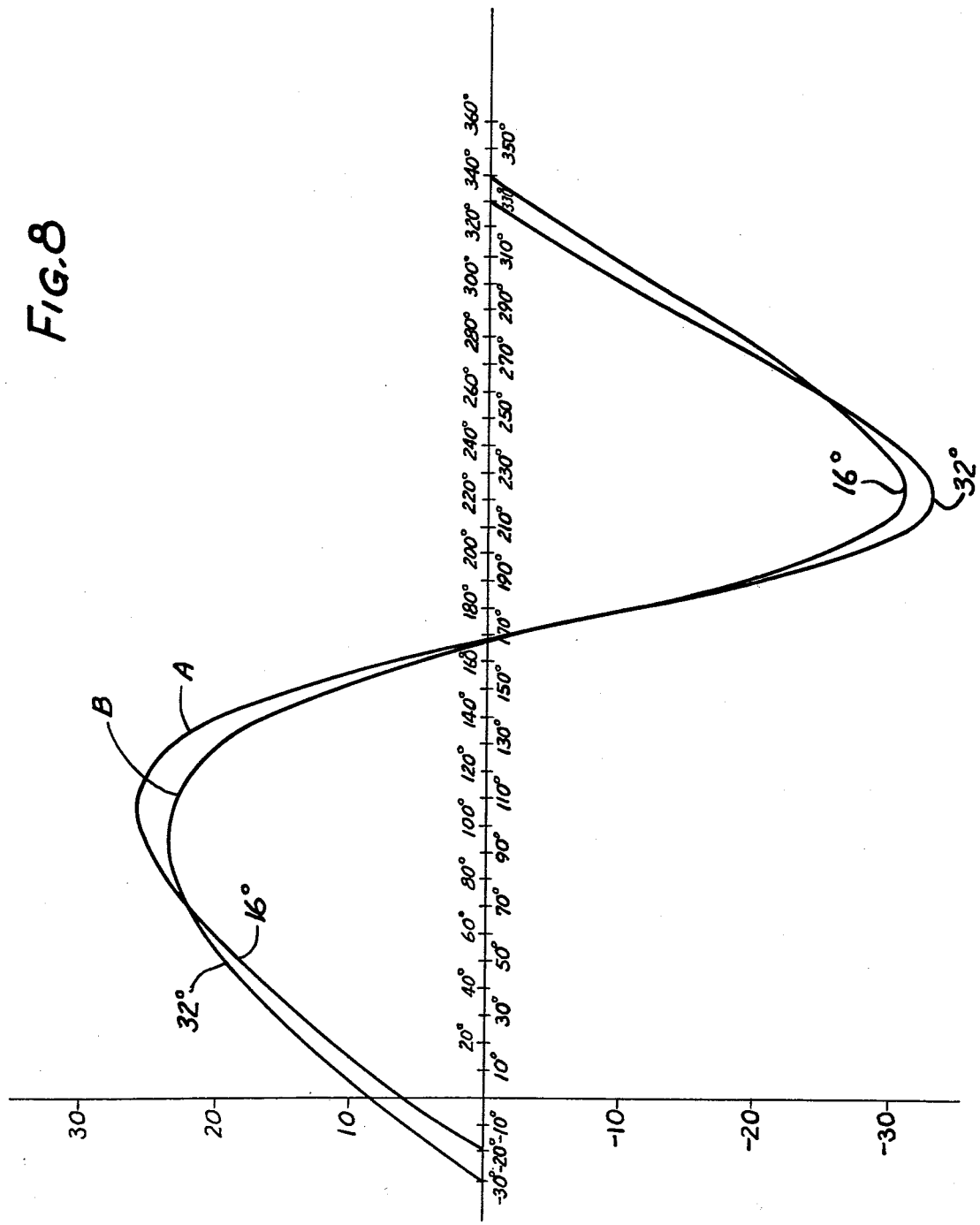

SHAKER CONVEYOR AND DRIVE MECHANISM THEREFOR

The present invention relates generally to drive mechanisms for use with shaker conveyors and the like, and more particularly to a shaker conveyor drive mechanism having a novel construction which provides a substantially reduced noise level, results in reduced manufacturing costs, and provides improved operating efficiencies over the prior art devices.

Shaker conveyors are generally known which take the form of one or more conveyor troughs supported for longitudinal reciprocating movement in a manner to convey particulate material, such as coal and the like in a desired direction. Conventionally, the conveyor troughs of such shaker conveyors are caused to be accelerated in the direction of desired material movement until a maximum velocity is reached whereupon the trough is decelerated rapidly and its direction of movement is reversed so that the particulate material slides along the trough an incremental distance in the desired direction. During movement of the trough in a direction opposite to the desired direction of movement of the material along the trough, the trough is caused to decelerate until it comes to rest. Immediately thereafter, the trough is again caused to move in its forward direction and is slowly accelerated so that there is little or no backward slide of the material on the conveyor trough. This back and forth reciprocating movement of the conveyor trough takes place rapidly.

One type of drive mechanism for effecting reciprocating movement of shaker conveyors is disclosed in U.S. Pat. No. 2,123,685. This shaker conveyor drive mechanism is representative of the prior art shaker conveyor drive mechanisms which employ planetary gear systems or variations thereof which are operative through rocking arms and puller rods to effect reciprocating movement of associated conveyor troughs. While many of these prior art shaker conveyor drive mechanisms have proven satisfactory in operation, they employ rather complex operating elements and are therefore relatively expensive to manufacture. Additionally, such prior art shaker conveyor drive mechanisms exhibit substantially higher noise levels than are desirable in many applications.

One of the primary objects of the present invention is to provide a drive mechanism for shaker conveyors and the like which overcomes the disadvantages found in the prior art shaker conveyor drive mechanisms.

Another object of the present invention is to provide a drive mechanism for shaker conveyors and the like which is highly efficient in operation and economical to manufacture, and which operates at a substantially reduced noise level than the prior art drive mechanisms.

Another object of the present invention is to provide a shaker conveyor which employs a drive unit mounted such that a puller rod connecting an output crank to the conveyor trough moves in a plane parallel to the direction of movement of the trough, with the result that any vertical component of vibration of the conveyor trough is substantially eliminated with attendant reduction in dust and the like created during the movement of particulate material, such as coal and the like, along the conveyor trough.

Still another object of the present invention is to provide a shaker conveyor drive mechanism which may be readily adjusted to selectively vary the acceleration characteristics of the associated conveyor trough without adjustment of the internal elements of the drive mechanism.

Another object of the present invention is to provide a drive mechanism for shaker conveyors and the like wherein the forces acting on the internal elements of the drive unit are substantially balanced whereby to prolong the operating life of the drive unit and effect a corresponding reduction in the noise level of the unit.

A feature of the shaker conveyor drive mechanism in accordance with the present invention lies in the provision of an improved slide block connection between an input crank and an output crank, which slide block connection is self-aligning and results in reduced wear of the slide block.

Another feature of the present invention resides in the provision of a sealed housing chamber filled with lubricant in a manner to provide a self-contained lubricating system and assist in reducing the noise level of the drive unit.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 1 is a side elevational view of a shaker conveyor employing drive mechanism in accordance with the present invention;

FIG. 2 is a top plan view of the conveyor of FIG. 1;

FIG. 6 is a top view generally similar to FIG. 5 but partially in section and with the pull rod and shield plate removed to more clearly illustrate the cooperation of the drive housing with the mounting beam;

FIG. 8 illustrates velocity curves characteristic of the shaker conveyor drive of the present invention;

GENERAL DESCRIPTION

Figure 3:
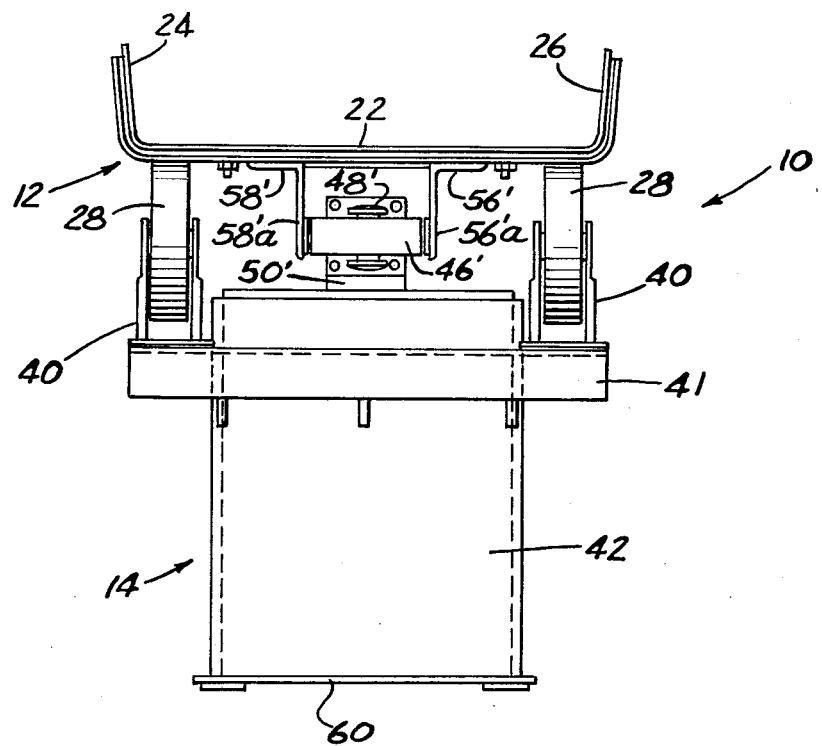
FIG. 3 is an end view of the conveyor of FIG. 1, taken generally along the line 3—3 of FIG. 1 and looking in the direction of the arrows.
Figure 7:
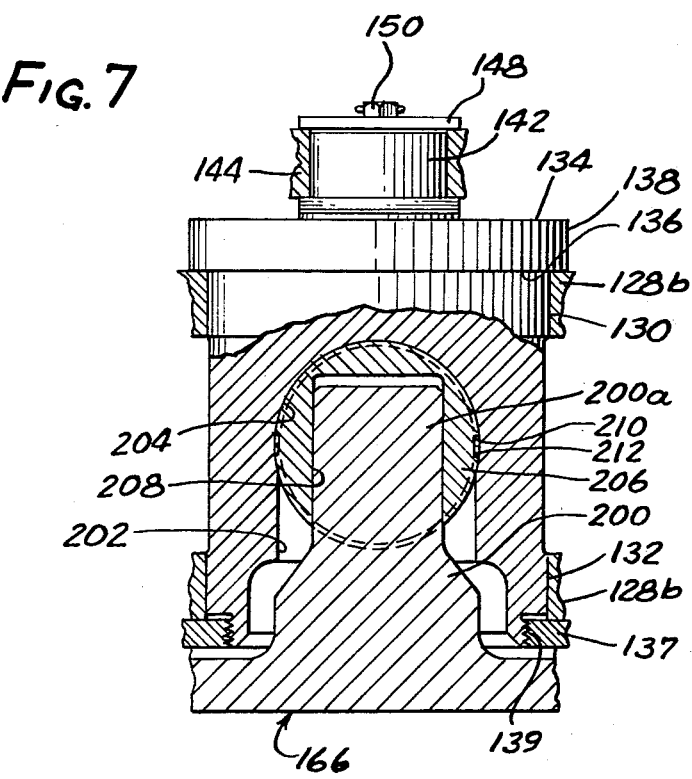
FIG. 7 is a sectional view taken substantially along the line 7—7 of FIG. 4, looking in the direction of the arrows.

Referring to the drawings, and in particular to FIGS. 1–3, the present invention is illustrated, by way of example, in conjunction with a shaker conveyor illustrated generally at 10. The shaker conveyor 10 is adapted to convey particles, such as coal and the like, along the longitudinal axis of the shaker conveyor. To this end, the shaker conveyor 10 includes an elongated conveyor trough, indicated generally at 12, which is supported in a generally horizontal position for reciprocating movement in the direction of its longitudinal axis by base frame means, indicated generally at 14. The base frame means 14 is adapted to support the conveyor trough 12 in spaced relation above a ground or floor surface, indicated at 16, which may comprise the floor of a mine or the floor surface of a building or other facility in which the shaker conveyor 10 is employed.

To effect reciprocating movement of the conveyor trough 12 along its longitudinal axis, a drive mechanism means, indicated generally at 18, is supported by the base frame means 14 in underlying relation to the conveyor trough 12 and is operatively connected with the conveyor trough 12 through puller rod means, indicated generally at 20.

As will become more apparent hereinbelow, the drive mechanism means 18 is adapted to effect reciprocating movement of the conveyor trough 12 in a manner to move particles disposed on the conveyor trough in a predetermined direction and at a predetermined rate of movement along the conveyor trough. The drive mechanism means 18 is adjustable to vary the time-velocity characteristics imparted to the conveyor trough without having to disassemble the drive mechanism or adjust internal elements thereof. The drive mechanism means 18 is extremely quiet in operation and employs substantially fewer components than found in the prior art shaker conveyor drive mechanisms.

DETAILED DESCRIPTION OF SHAKER CONVEYOR

The conveyor trough 12 includes a bottom wall surface 22, which in the illustrated embodiment lies in a substantially horizontal plane, and has upstanding generally parallel side walls 24 and 26 which are disposed laterally of the longitudinal axis of the shaker conveyor. Pairs of transversely aligned U-shaped guide members 28 are secured to the lower surface of the bottom wall 22 and are spaced longitudinally inwardly from the opposite ends thereof. Each of the U-shaped guide members 28 has upper and lower wear plates 30 and 32, respectively, associated therewith which slidingly engage the peripheral surface of a circular load carrying roller 34. Each of the forward rollers 34 is rotatably supported by a support yoke 36 mounted on a transverse angle member 38 which, in turn, is supported on the upper end of a generally vertically and centrally disposed column 39 of the frame means 14. The rear load carrying rollers 34 are rotatably supported by yokes 40 secured on a transverse angle member 41 which is affixed to and supported by an upwardly inclined support channel 42. The wear plates 30 and 32 are of sufficient length to slidingly engage the associated rollers 34 throughout full longitudinal movement of the conveyor trough 12, the rollers 34 serving to provide vertical support and guidance for the conveyor trough.

The conveyor trough 12 is restrained from lateral movement during its longitudinal reciprocating movement by forward and rear guide rollers 46 and 46', respectively. The forward circular guide roller 46 is supported in a horizontal plane by a U-shaped yoke 48 which is secured to an angle bracket 50 affixed to the upper surface of a horizontal frame member 52. The frame member 52 has its forward end supported by the support column 40 and has its rearward end secured to an upstanding U-shaped support member 54 which forms a portion of foundation to support the drive mechanism means 18. A pair of laterally spaced angles 56 and 58 (FIGS. 2 and 3) are secured to the lower surface of the bottom wall 22 of the conveyor trough 12 and have depending flange portions 56a and 58a disposed on opposite sides of the peripheral surface of the guide roller 46 to provide lateral stability for the conveyor trough.

The rear guide roller 46' is supported in a horizontal plane by a U-shaped support yoke 48' and an angle bracket 50' for guiding relation with the depending flange portions 56a' and 58a' of angles 56' and 58' disposed generally centrally between the rearward load carrying rollers 34. The rear guide roller 46' provides lateral stability for the rearward end of the conveyor trough 12. The upstanding support member 54 and the upwardly inclined support channel 42 are secured at their lower ends to a generally rectangular plate 60 which may be suitably secured to the floor support surface 16 to fixedly position the shaker conveyor 10. A strut 62 is connected between the support column 40 and the base plate 60 to provide rigidity to the base frame means 14.

It will be appreciated that other means may be employed in place of the rollers 34, 46 and 46' to support and provide lateral guidance for the trough 12 during its reciprocating movement. For example, low friction pads or blocks (not shown) may be mounted on the frame means 14 for cooperation with inverted generally U-shaped brackets (not shown) secured to the underside of the conveyor trough, the brackets being longitudinally slidable on the low friction blocks. Four such pads placed at the positions of the the described rollers 34 could replace the rollers 34 and the guide rollers 46 and 46'.

DETAILED DESCRIPTION OF DRIVE MECHANISM

With reference to FIGS. 4-7, taken in conjunction with FIG. 1, the drive mechanism means 18 includes a mounting beam 66 which is supported on the upper ends of the support member 54 and the support channel 42 in underlying generally parallel relation to the bottom wall 22 of the conveyor trough 12. The mounting beam 66 has a forward end portion 66a and a rearward end portion 66b. The mounting beam 66 may be secured to the upper ends of the support member 54 and channel 42 by bolts or welding or the like to rigidly connect the mounting beam to the frame means 14. A generally vertical support plate 68 has its lower edge secured, as by welding, to the base plate 60, and has its upper edge secured to the rearward end 66b of the mounting beam 66, the support plate 68 being disposed generally transverse to the longitudinal axis of the shaker conveyor 10.

The mounting beam 66 has an opening 70 therethrough (FIGS. 5 and 6) at least a portion of which is defined by an arcuately shaped bumper plate 72 which is preferably formed integral with the mounting beam 66. The arcuate shaped bumper plate 72, alternatively termed a mounting plate segment, has a generally vertically disposed concave surface 74 which forms an arcuate segment of a right cylindrical cylinder. The diameter of the arcuate surface 74, considered along the longitudinal axis of the mounting beam 66, is greater than the longitudinal dimension of opening 70 so as to establish a second arcuate surface 76 on the mounting beam 66 substantially diametrically opposite the arcuate surface 74. The arcuate surfaces 74 and 76 intersect the upper surface 78 of the mounting beam 66 and extend vertically downwardly from the upper surface 78 a distance less than the thickness of the beam 66 to define shoulder or ledge surfaces 74a and 76a, respectively, which lie in a common plane parallel to the upper planar beam surface 78. It will be noted that the opening 70 is substantially larger than the common diameter of the arcuate surfaces 74 and 76 in those areas of the opening 70 intermediate the arcuate surfaces 74 and 76, when considered in plan view. The arcuate surfaces 74 and 76 provide reference surfaces on the mounting beam 66 as will be described more fully hereinbelow.

The arcuate shaped bumper plate 72 has twelve through-bores 82 (FIG. 6) formed therein which intersect the arcuate surface 74. The axes of the bores 82 lie in a common plane perpendicular to the center axis of the arcuate surfaces 74 and 76 and intersect this center axis. In the illustrated embodiment, the bores 82 are equally angularly spaced at 8 degrees between centerlines about the center of curvature of the arcuate surface 74 on the mounting beam, with one of the bores 82 having its axis lying in a vertical plane containing the longitudinal axis of the mounting beam and being termed a "neutral" bore. Five bores 82 are equally angularly spaced to one side of the "neutral" bore, and six of the bores 82 are equally angularly spaced on the opposite side of the "neutral" bore, when considered in FIG. 6. Each of the bores 82 is counterbored at 84 to receive the head of a mounting bolt as will be described more fully hereinafter.

The mounting beam 66 serves to support housing means, indicated generally at 88, which takes the form of a housing member 90 having a generally annular configuration. The housing 90 is received within the opening 70 of the mounting beam 66 and is rotatable about the axis of the arcuate reference surfaces 74 and 76. To this end, the housing 90 has outer cylindrical surface portions 92a and 92b (FIG. 4) which lie in a plane normal to the longitudinal axis of the housing 90. The peripheral cylindrical surface portions 92a and 92b have a common diameter sufficient to allow the housing 90 to be seated within the opening 70 such that the annular shoulder surfaces 94a and 94b engage the ledge surfaces 74a and 76a, respectively, formed on the mounting beam 66 adjacent the arcuate reference surfaces 74 and 76. The diameter of the cylindrical surface portions 92a and 92b on the housing 90 is made to establish a sliding relation with the reference surfaces 74 and 76 on the mounting beam 66.

With particular reference to FIG. 6, flat parallel planar surface areas 96 and 98 are disposed between the surface portions 92a and 92b of the housing 90, the surfaces 96 and 98 lying in planes parallel to the longitudinal axis of housing 90. The surfaces 96 and 98 are formed to facilitate positioning of the housing 90 upwardly through the opening 70 in the mounting beam 66 during assembly of the drive mechanism means 18. Briefly, during such assembly, the housing 90 is positioned such that the flat surfaces 96 and 98 are transverse to the longitudinal axis of the mounting beam 66 as the housing is inserted upwardly through the opening 70, whereafter the housing 90 is rotated 90° to effect seating of the annular shoulder surfaces 94a and 94b onto the ledge surfaces 74a and 76a, respectively, of the mounting beam 66.

The housing 90 has a lower cylindrical surface 102 (FIG. 4) which is concentric with its upper cylindrical surface portions 92a and 92b. The cylindrical surface 102 has a diameter less than the distance between the flat surfaces 96 and 98 on housing 90, and serves as a bearing support surface for a bearing block 104 to be described more fully hereinbelow.

Figure 4:
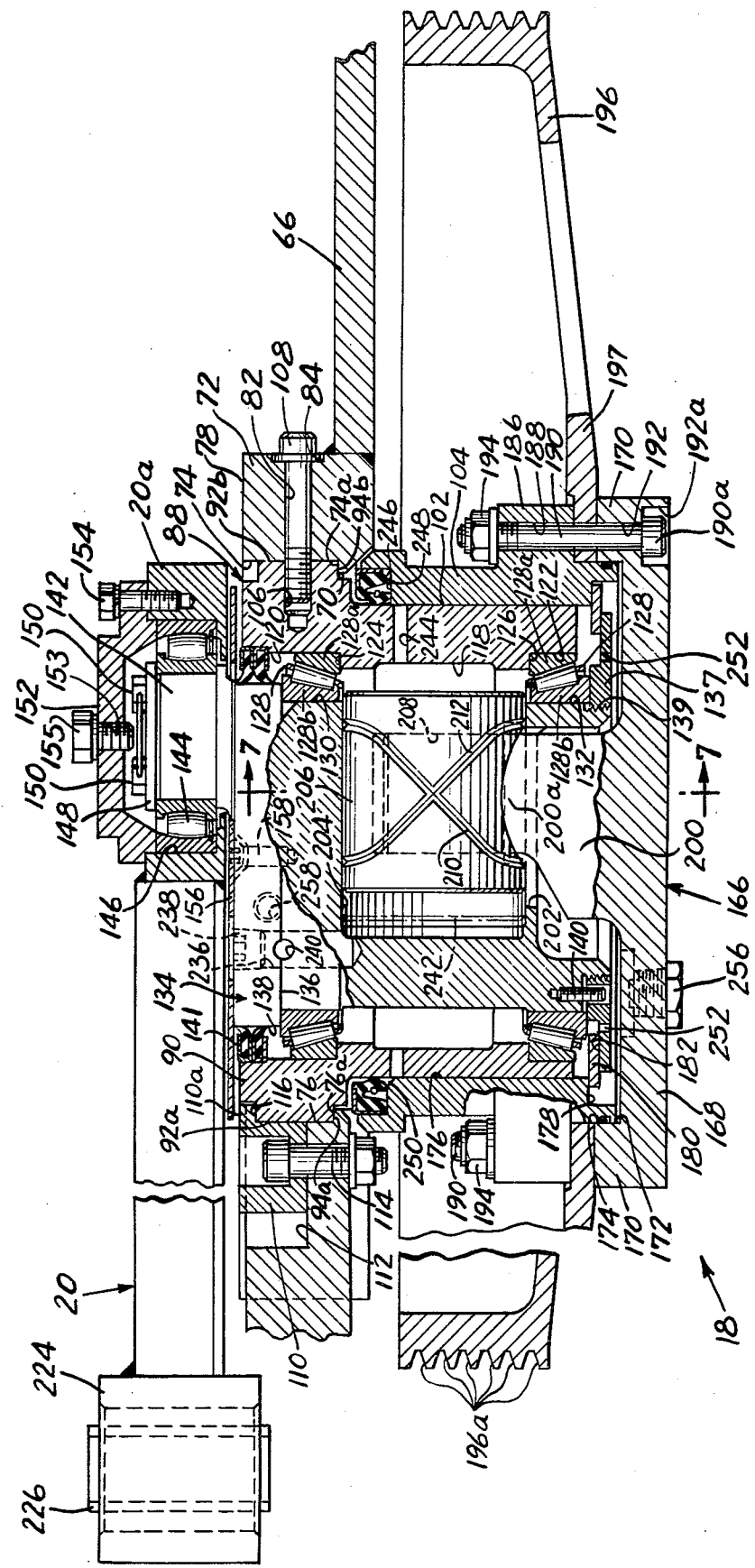
FIG. 4 is a partial sectional view through the longitudinal axis of the drive mechanism employed in the shaker conveyor of FIG. 1.

Noting FIGS. 4 and 6, a plurality of tapped bores 106 are formed in the cylindrical surface portion 92b of the housing 90, with the axes of the tapped bores lying in a common plane perpendicular to the longitudinal axis of housing 90. The tapped bores 106 are adapted for selective registration with the aforedescribed bores 82 in the bumper plate 72 of the mounting beam 66. In the illustrated embodiment, nine tapped bores 106 are formed in the housing 90 with the axes of the bores intersecting the center axis of the surface 92b and being spaced apart by 8° angular increments. The tapped bores 106 are adapted to threadedly receive screws 108 inserted through the bores 82 which are aligned with the threaded bores 106. The screws 108 serve to maintain the housing 90 in a selected rotational position relative to the mounting beam 66. A hold-down clamp 110 is received within a suitable recess 112 formed in the mounting beam 66 adjacent the reference surface 76. The hold-down clamp 110 is adapted to be releasably retained within the recess 112 by a bolt 114, and has a lip portion 110a which engages a portion of an annular shoulder surface 116 on the housing 90. In this manner, the hold-down clamp 110 cooperates with the screws 108 to fixedly retain the housing 90 in its selected rotational position relative to the mounting beam 66.

The housing 90 has an internal recess 118 which includes two cylindrical, equal diameter, concentric bearing support surfaces 120 and 122. The axis of the annular surfaces 120 and 122 is parallel and eccentric to the axis of outer concentric surfaces 92a, b and 104 of housing 90. The annular surfaces 120 and 122 serve as reference surfaces and cooperate with adjacent annular shoulder surfaces 124 and 126, respectively, to receive the outer races or cups 128a of roller bearings 128. Annular inner races 128b of the bearings 128 are secured on annular cylindrical surfaces 130 and 132 of an output crank, indicated generally at 134, in a manner to rotatably support the output crank within the recess 118 in housing 90.

The output crank 134 has an annular radial shoulder surface 136 formed thereon between the cylindrical surface 130 and an outer cylindrical surface 138. The shoulder surface 136 serves to abut the inner race 128b of the upper roller bearing 128 in a manner to axially support the output crank 134 within the internal chamber 118 of the housing 90. An annular retainer member 137 having a central threaded bore therethrough is threadedly mounted on a threaded annular surface 139 on the output crank 134 and is adjusted to engage the inner race 128b of the lower bearing 128 so as to prevent upward axial movement of the output crank 134 relative to the housing 90. A set screw 140 is received through a suitable opening in the retainer member 137 and is secured in a tapped hole in the output crank 134 to retain the retainer member in its assembled position on the output crank 134. A conventional annular oil seal 141 is supported by the housing 90 to engage the annular surface 138 on the output crank 134 adjacent the upper end thereof in sealing relation. It will be understood that since the axis of the bearings 128 is eccentric to the axis of the outer surface 102 of housing 90, the axis of rotation of the output crank 134 will also be equally eccentric to the axis defined by the outer housing surface 102.

The output crank 134 has a stepped cylindrical crank arm 142 formed integral therewith which extends vertically upwardly from the upper end of the output crank. The axis of the crank arm 142 is parallel and eccentric to the axis of rotation of the output crank 134. The crank arm 142 is connected to an end 20a of the puller arm 20 in a manner to effect movement of the puller arm in a horizontal plane as the output crank 134 is caused to rotate relative to the housing 90. To this end, the crank arm 142 supports a suitable bearing 144 the outer race of which is received within a circular recess 146 formed in the end 20a of the puller arm 20. The inner race of the bearing 144 is received over the crank arm 142 and is retained in fixed position thereon by a clamping plate 148 secured against the upper end of the crank arm 142 by screws 150. After the end 20a and bearing 144 are secured on the crank arm 142 by the clamping plate 148, a cover plate or cap 152 is secured to the end 20a of the puller rod by suitable means such as screws 154. The cover plate 152 has a suitable tapped opening 153 formed generally centrally therein through which a long bolt (not shown) may be inserted, with the clamp plate 148 and screws 150 removed and the cover plate 152 again secured on the puller rod end 20a, to remove the bearing 144 and puller rod from the crank arm 142. The tapped opening 153 receives a plug bolt 155 when not in use. It will be understood that the puller arm 20 is connected to the crank arm 142 after the housing 90 and associated elements supported thereby are secured to the mounting beam 66, and after a circular shield plate 156 is secured to the upper horizontal surface of the output crank 134 by screws 158 as shown. A grease fitting 160 (FIG. 5) on the puller rod end 20a provides means for lubricating the bearing 144.

To effect rotation of the output crank 134 relative to the housing 90, the drive mechanism means 18 includes an input crank, indicated generally at 166, which is supported by the bearing block 104 for rotation about the axis of the outer annular surfaces 92 and 102 on housing 90. The input crank 166 includes a generally circular plate portion 168 which has an annular upstanding rim 170 having an inner cylindrical reference surface 172. The reference surface 172 is slidably received over and references against an outer cylindrical surface 174 on the bearing block 104. The bearing block 104 has an inner cylindrical surface 176 which is concentric with the cylindrical surface 174 and is slidingly received over the annular reference surface 102 on the housing 90 so as to be freely rotatable about the axis of the cylindrical surface 102. The bearing block 104 has an annular bearing surface 178 which is disposed in a plane perpendicular to the axis of the housing 90 and is slidingly supported by an overlap ring 180. The overlap ring 180 is in turn supported by and slidable on an annular radial finished surface 182 formed on the aforedescribed retainer member 137. In this manner, the overlap ring 180 is slidable in its own plane due to the eccentricity of the axis of rotation of the output crank 134 relative to the axis of the cylindrical surface 102 on housing 90.

The bearing block 104 includes an annular boss 186 which has a plurality of bores 188 formed therein parallel to the axis of rotation of the bearing block and axially aligned with bores 192 formed in the annular rim 170 of the input crank 166. The bores 188 and 192 receive mounting bolts 190 therethrough which, with the bolt heads 190a and nuts 194, support the input crank 166 on the bearing block 104. The heads 190a of bolts 190 are received within counterbores 192a.

The bolts 190 further serve to fixedly secure a sheave 196 to the bearing block 104. To this end, the sheave 196 has an inner annular rim portion 197 having suitable throughbores spaced peripherally thereabout to receive the bolts 190 such that the rim 197 is secured between the upper surface of the annular rim 170 of the input crank 166 and the annular boss 186 of the bearing block 104. As will be described more fully below, the sheave 196 is adapted to be connected in driven relation to an electric drive motor 198 to be described more fully below.

The input crank 166 includes an input crank arm 200 which is preferably formed integral with the circular plate portion 168 and extends upwardly in normal relation to the plane of the plate 168. The input crank arm 200 includes an upper cylindrical portion 200a the axis of which is eccentric to the axis of rotation of the input crank 166. The cylindrical portion 200a of the input crank arm 200 extends upwardly through a suitable opening 202 in the output crank 134 where it is received within a cylindrical bore 204 formed in the output crank 134, the axis of the bore 204 being perpendicular to the longitudinal axis of the output crank. A cylindrical slide block 206 is received within the bore 204 in output crank 134 and is slidable along the longitudinal axis of the bore 204. As shown in FIG. 4, the bore 204 intersects the peripheral surface of output crank 134 to define an opening to receive the slide block 206. The cylindrical slide block 206 has a transverse cylindrical bore 208 which receives the upper end 200a of the input crank arm 200 in sliding rotational relation therein. In this manner, it can be seen that when the crank arm portion 200a is rotated about the axis of rotation of the input crank 166, such rotational movement will be translated to the output crank 134 through the slide block 206. Because the axis of rotation of the crank arm 200a does not coincide with the axis of rotation of the output crank 134, the slide block 206 will undergo reciprocating sliding movement along the axis of bore 204 during each revolution of the input crank 166. The outer peripheral cylindrical surface of the slide block 206 is provided with oil grooves 210 and 212 which facilitate the introduction of lubricant between the sliding surfaces of the bore 204 and the slide block 206.

The sheave 196 of the input crank 166 is connected to the electric motor 198 (FIGS. 1 and 2) to effect driven rotation of the input crank 166. To this end, one or more drive belts 218 are reeved about the sheave 196 in V-shaped grooves 196a formed peripherally thereon, and about a suitable drive pulley 220 secured on the drive shaft 222 of the drive motor 198. The motor 198 is mounted on the upstanding support beam 54 with its axis disposed generally vertically. The motor 198 may comprise any suitable commercially available reversible constant speed A.C. motor of sufficient horsepower for the intended load to be conveyed by the shaker conveyor 10. Alternatively, a pneumatic, hydraulic or other suitable drive motor may be employed. The belt 218 may comprise a single drive belt or a plurality of individual V-belts drivingly connecting the drive motor 198 to the sheave 196.

It will be noted that the V-shaped drive grooves 196a in the sheave 196 are disposed such that the median plane through the drive belt 218 intersects the bearing block 104 at approximately midlength of its vertical height, as considered in elevation. This serves to minimize bending moments acting on the bearing block 104 through the sheave 196.

The end of the pull rod 20 opposite the end 20a thereof terminates in a center joint 224 which is formed integral with or otherwise suitably secured to the pull rod 20. The center joint 224 has a bushing sleeve 226 secured therein such that the bore of the sleeve 226 is transverse to the longitudinal axis of the pull rod 20. The center joint 224 on the pull rod 20 is pivotally connected to a pivot pin 228 (FIGS. 1 and 2) which is supported by a bifurcated support bracket 230 which, in turn, is suitably secured to the lower surface of the bottom wall 22 of the conveyor trough 12. A reinforcing web 232 is preferably fixed to the lower surface of the bottom wall 22 of the conveyor trough 12 for reinforcing the same.

An important feature of the present invention lies in its quietness during operation. This quietness is achieved in part by the fact that the resultant forces from the input crank 166 acting through the slide block 206 and output crank 134 to the pull rod 20 lie in a plane intermediate the parallel planes containing the upper and lower bearings 126 which support the output crank 134 on housing 90. As a result of the geometrical relationship of the elements of the drive mechanism 18, the forces acting in transverse planes above and below the bearings 128, as considered in FIG. 4, which would result in bending moments tending to rock or gyrate the output crank 134 about its axis of rotation are substantially negligible. The noise level is further reduced by the fact that the housing 90, the bearing block 104 and the output crank 134 are relatively massive and substantially reduce the resonance of the unit.

Another feature of the drive mechanism 18 which contributes to the reduced noise level is the fact that the cavity areas within the drive mechanism 18 are filled with lubricating oil. To this end, the output crank 134 has an oil input port 236 formed in its upper surface to intersect the bore 204 within the output crank. The oil input port 236 is adapted to receive a plug 238 therein to sealingly close the upper end of the input port after introducing a desired amount of lubricant into the cavity openings within the drive mechanism 18. A cross bore passage 240 extends through the output crank 134 and intersects both the input port 236 and the outer peripheral surface of the output crank 134 at a height sufficient to introduce lubricant oil above the upper bearing 128. With oil disposed within the cavity areas of the drive mechanism 18, it can be seen that when the slide block 206 is moved to a position as indicated by the phantom line 242 in FIG. 4, the slide block 206 acts as a pumping piston to force oil upwardly through the port 236 and through the cross bore 240 into the area above the upper bearing 128. The oil forced through the cross bore 240 drains down through the upper bearing 128 where it is forced outwardly through a cross-passage 244 in the housing 90, the lubricating oil caused to pass through the cross passage 244 serving to bias a garter type oil seal 246 supported within a recess 248 in the bearing block 104 against the outer cylindrical surface 102 of the housing 90. The oil from the cross-passage 244 may pass through a bleed space 250 formed by a chamfer or bevel edge on the bearing block 104 adjacent the recess 248. Lubricant oil from the crosspassage 244 also serves to lubricate the sliding interface of surfaces 102 and 176 of the housing 90 and slide block 104, respectively. A ball check-valve (not shown) may be positioned within the lower end of the oil input port 236 in a manner to prevent reverse flow of oil from the direction of pumped oil flow as described.

Oil passing downwardly through the upper bearing 128 from the cross-passage 240 passes downwardly through the lower bearing 128 and through a plurality of flow passages or openings 252 formed through the nut 137. The oil level in the drive mechanism 18 is maintained at a level sufficient to insure that when the slide block 206 is in its position of maximum eccentricity relative to the axis of rotation of the output crank 134, oil will pass upwardly through the opening 202 preparatory to the next successive pumping stroke of the slide block 206. In this manner, circulation of lubricating oil within the drive mechanism 18 is maintained.

A drain plug 256 is provided in the input crank 166 in a position to allow draining of the lubricating oil from the cavities within the drive mechanism 18. Preferably, a flow passage 258 (FIGS. 4 and 6) is formed in the housing 90 to intersect the outer flat surface 96 and the inner cylindrical surface 120. The passage 258 provides means for connecting an external oil reservoir (not shown) to the inner cavity area below the annular oil seal 140 if desired. Such oil reservoir would serve as an expansion tank to accommodate changes in oil volume during various operating temperature changes, and would thereby prevent undesirable oil pressure fluctuations within the drive mechanism 18. A suitable plug or cap 259 is provided to plug the outer end of the passage 258 when not connected to an oil reservoir tank. The drain plug 256 has a magnetic insert (not shown) in its inner end which serves to retain any burrs or metallic contaminants thereon for removal from the lubricating oil.

When mounting the assembly of the housing 90, bearing block 104, input crank 166 and output crank 134 onto the mounting beam 66, with the puller rod 20 and shield 156 removed, the housing 90 is positioned below the opening 70 in mounting beam 66 with the flats 96 and 98 disposed generally parallel to the arcuate reference surfaces 74 and 76. The housing 90 is then moved upwardly until the annular shoulder surfaces 94a and 94b are slightly higher than the plane of surfaces 74a and 76a on the mounting beam 66, whereafter the housing 90 is rotated to effect engagement of the shoulder surfaces 94a and 94b with the support surfaces 74a and 76a on the mounting beam 66. After rotating the housing 90 to a selected rotational position relative to the mounting beam 66, as will be discussed more fully below, the hold-down clamp 110 is mounted on the mounting beam 66 to secure the edge 94a opposite the bores 106 against the support surface 76a. Mounting screws 108 are then secured within the bores 106 in the housing 90 and the associated aligned bores 82 in the bumper plate 72 of the mounting beam.

Figure 5:
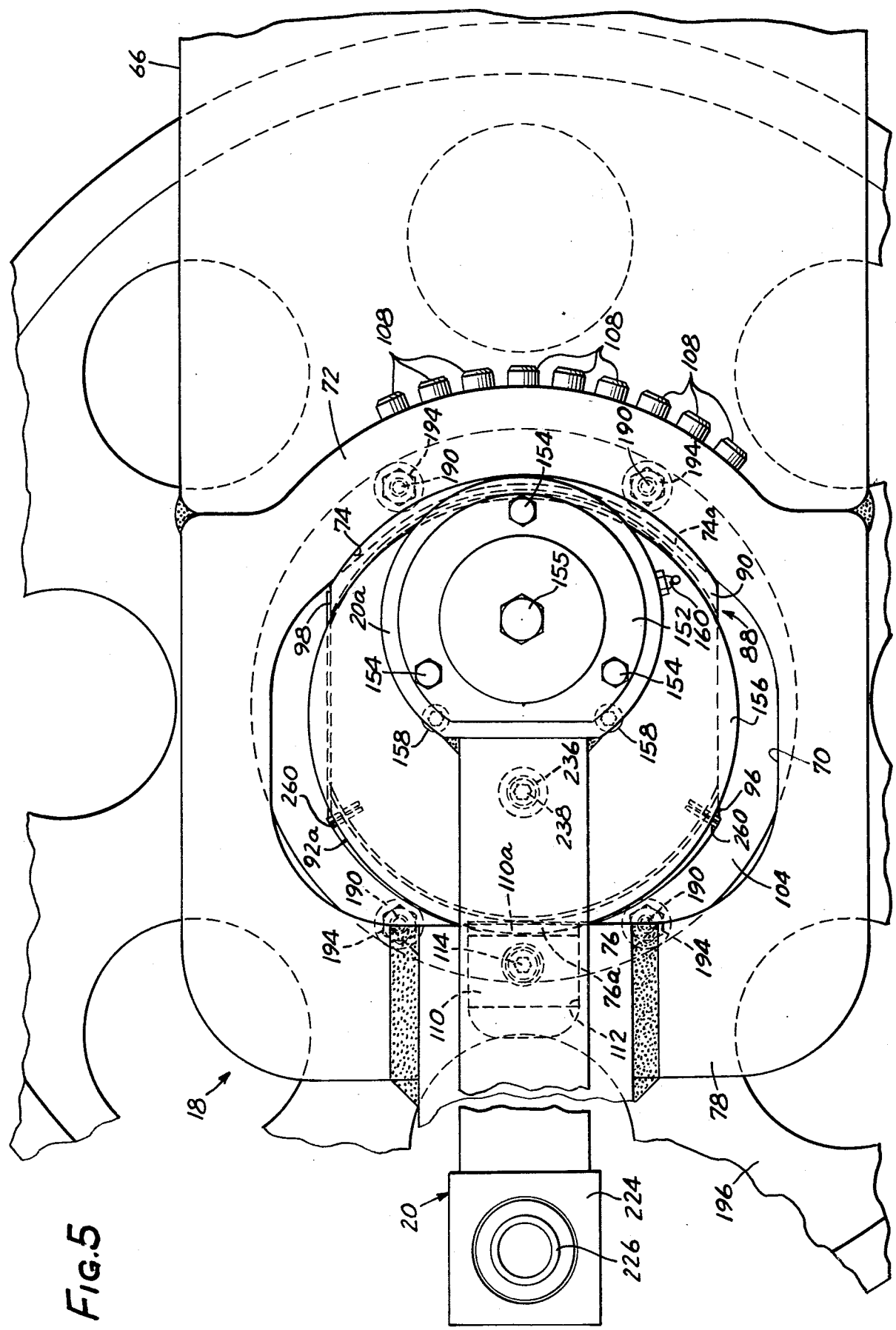
FIG. 5 is a top plan view of the drive mechanism shown in FIG. 4.

To prevent accidental rotation of the housing 90 to a position wherein it could drop downwardly from the mounting beam 66 prior to inserting the mounting bolts 108, a pair of stop pins 260 are secured to the housing 90 above the shoulder surface 116 as shown in FIGS. 5 and 6. The stop pins 260 extend generally radially outwardly from housing 90 and are angularly positioned relative to the axis of rotation of housing 90 such that when the housing is mounted on the mounting beam 66 and the hold-down clamp 110 is loosely fixed within the recess 112, one or the other of the pins 260 will engage the hold-down clamp 110, depending upon the direction of rotation of housing 90, and prevent rotation of the housing to a position wherein it could accidentally drop downwardly through the opening 70 in the mounting beam 66.

Having thus described one embodiment of the drive mechanism means 18 in accordance with the present invention, it can be seen that a shaker conveyor drive mechanism is provided which is adapted to effect selective reciprocating movement of the conveyor trough 12 in the direction of its longitudinal axis. With reference to FIG. 8, operating characterisitc curves are shown which depict the rectilinear velocity of the conveyor trough 12 in relation to the angular rotational position of the output crank 134 for a given rotational speed of the output crank. The different velocity curves for the conveyor trough movement are obtained by varying the orbital path of the output crank arm 142 in relation to the longitudinal axis of the conveyor trough. The vertical coordinate of the curves of FIG. 8 indicates the velocity of the conveyor trough 12 in inches per second during longitudinal movement in both forward and rearward directions. The horizontal or abscissa coordinate of the curves of FIG. 8 indicates the angular position, in degrees, of the output crank 134 about its axis of rotation. The "zero" position on the abscissa signifies the point at which a plane containing the axis of the output crank arm 142 and the axis of crank 134 is parallel to a plane containing the longitudinal axis of the mounting beam 66 and the axis of rotation of the housing 90, as considered in FIGS. 5 and 6.

By removing the bolts 108 and loosening the hold-down clamp 110, the housing 90 may be rotated in a counterclockwise direction, as considered in FIG. 5, to any one of five different increased angular positions wherein the included angle between the plane containing the axes of rotation of output crank 134 and housing 90 and the plane containing the longitudinal axis of mounting beam 66 and the axis of rotation of housing 90 is increased in angular increments of 8° up to a maximum angular adjustment, in the illustrated embodiment, of 48°. Similarly, the housing 90 may be rotated in a clockwise direction relative to the mounting beam 66. Thus, the housing 90 may be selectively rotationally adjusted in increments of 8° in either a clockwise or counterclockwise direction from the zero position of the housing as shown in FIGS. 5 and 6. It will be appreciated that fewer or greater incremental angular adjustments may be provided, and that the magnitude of each angular increment may be varied from the illustrated embodiment.

In actual practice, the housing 90 need not be rotated in a clockwise direction from its neutral or "zero" position shown in FIGS. 5 and 6. Rather, the housing 90 may be rotatably adjusted in a counterclockwise direction to a selected angular position relative to the mounting beam 66, and the direction of rotation of the output crank 134 reversed to impart substantially similar operating characteristics to the troughs as would be obtained were the housing 90 to be angularly adjusted in a clockwise direction to an equal but clockwise angular position relative to its neutral position. Thus, by angular adjustments or settings of the housing 90 in a counterclockwise direction relative to the mounting beam 66, and by reversal of the rotation of the output crank 134 at each such setting of the housing 90, two different operating curves for the conveyor trough 12 can be obtained for each selected rotational speed.

In one embodiment of the drive mechanism means 18, rotational adjustment of the housing 90 in a counterclockwise direction from its neutral or zero position, as shown in FIGS. 5 and 6, to a position wherein a plane containing the axis of rotation of the housing 90 and the axis of rotation of the output crank 134 forms an included angle of sixteen degrees with a plane containing the longitudinal axis of the mounting beam 66 and the rotational axis of housing 90, and rotating the output crank 134 in a clockwise direction at 115 r.p.m., results in a velocity characteristic curve of the conveyor trough 12 as shown by curve A in FIG. 8. It can be seen that with this setting, the conveyor trough 12 will undergo a moderate rate of travel toward its position of maximum forward displacement with a high or rapid snap back. The output crank 134 undergoes a predetermined variable angular velocity during each revolution thereof. Stated alternatively, the output crank 134 undergoes alternating angular acceleration and deceleration during each revolution thereof.

Further rotational adjustment of the housing 90 in a counterclockwise direction relative to the mounting beam 66 to a position wherein the aforenoted included angle is 32° will result in changing the velocity characteristics of the conveyor trough 12 as represented by the curve B in FIG. 8. Different velocity curves would be similarly obtained by adjustment of the housing 90 to other eight degree incremental positions relative to the neutral position of the housing as shown in FIG. 6. After selective angular adjustment of the housing 90 relative to the mounting beam 66, the connecting bolts 108 and hold-down clamp 110 are again adjusted to tightly retain the housing 90 in its new adjusted position.

It has been noted that for a given angular setting of the housing 90, i.e., at the 16° position of housing 90 relative to its neutral position, the velocity curve of the conveyor trough 12 will be as shown by curve A in FIG. 8 when the output crank 134 is rotated in a clockwise direction. By reversing the direction of rotation of the output crank 134 such that it rotates in a counterclockwise direction, and with the housing 90 positioned at the 16° counterclockwise position, the velocity curve of the conveyor trough 12 will take the form of the 16° curve A of FIG. 8 as considered by presenting the velocity curve A on transparent graph paper, turning the paper 180° about its vertical axis, viewing the thus positioned curve A from the reverse side of the graph paper, and transposing or reversing the angular degrees shown along the horizontal or abscissa axis so that the "zero" degree rotational position of the output crank is at the position formally indicated as the 360° coordinate. Thus, the zero velocity point of the velocity curve for counterclockwise rotation of output crank 134 at a 16° setting of housing 90 would originate from the 16° coordinate on the horizontal axis, with the velocity curve having an initial negative slope. In this fashion, it can be seen that the conveyor trough 12 undergoes a much higher acceleration (rate of change of velocity per degree rotation of crank 134) in its forward direction (represented by the portion of the velocity curve having an upward or positive slope) followed by a moderate snap back (represented by the portion of the velocity curve having a downward or negative slope). Thus, it can be seen that the energy transferred to the conveyed particles from the trough during movement of the conveyor trough may be varied by changing the rotational position of the housing 90 relative to its "zero" position, and by reversing the direction of rotation of output crank 134.

Figure 9:
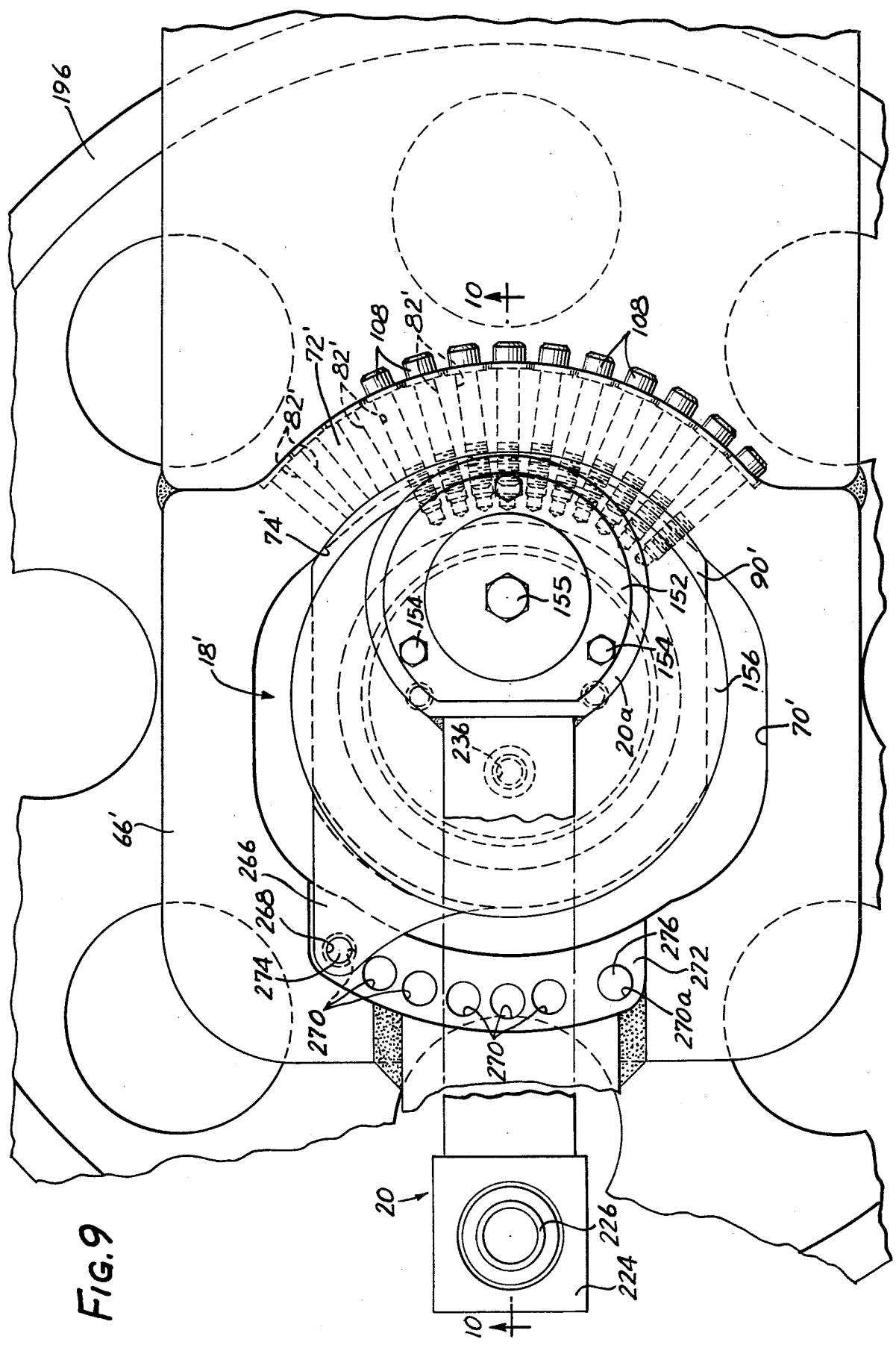
FIG. 9 is a partial plan view generally similar to FIG. 5 but illustrating an alternative manner of mounting a shaker conveyor drive mechanism in accordance with the present invention.
Figure 10:
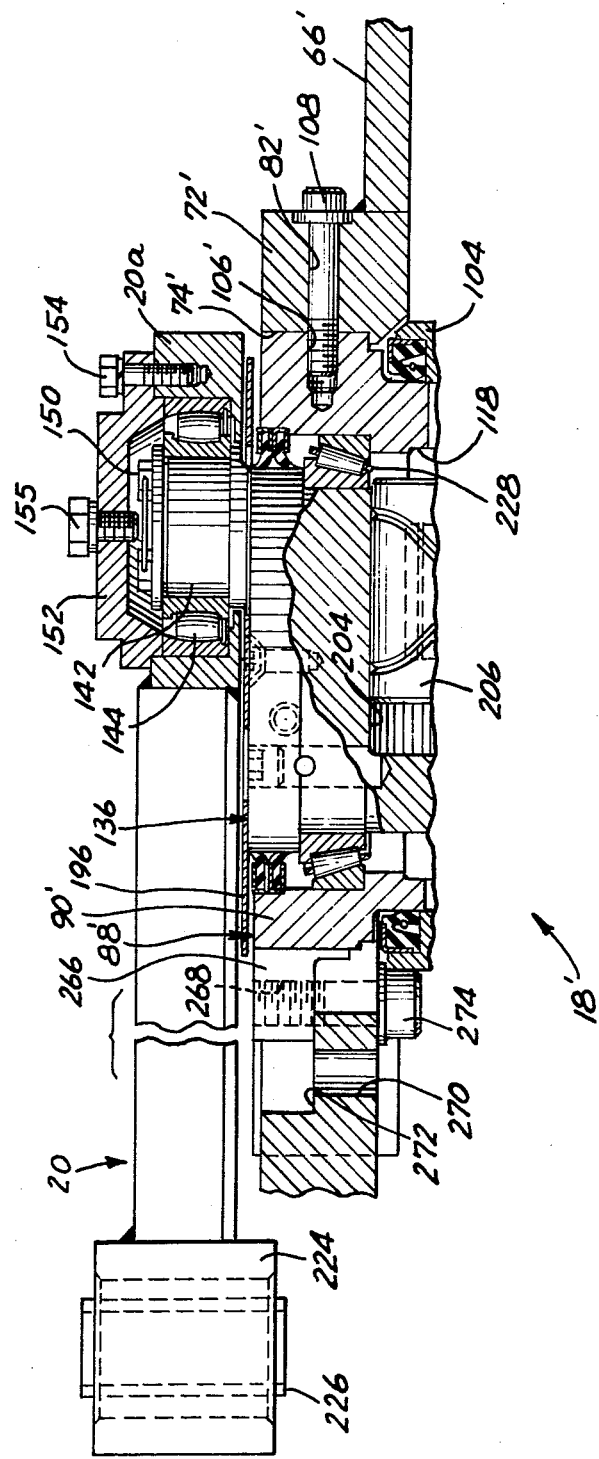
FIG. 10 is a partial longitudinal sectional view taken substantially along the line 10—10 of FIG. 9 and looking in the direction of the arrows.

FIGS. 9 and 10 disclose an alternative method or manner of mounting the drive mechanism 18 relative to the frame means 14 of the shaker conveyor 10. The drive mechanism means illustrated in FIGS. 9 and 10 is indicated at 18' and includes a housing 90' which differs from the above described housing 90 in that it includes a radially projecting horn portion 266 which has a tapped bore 268 transversely therethrough. A mounting beam 66' is provided which has a plurality of angularly equidistantly spaced bores 270 formed in a recessed support surface 272, the bores 270 lying on a common diameter having a radius equal to the radial distance of the center of the tapped bore 268 in the housing 90' from the axis of rotation of the housing 90'. In the illustrated embodiment, six bores 270 are angularly spaced apart by 8 degree increments about the axis of rotation of housing 90'. A bore 270a is also provided in the support surface 272 on the diameter of bores 270 and is angularly offset from the remaining bores 270, as shown in FIG. 9, by 12°.

The bores 270 are disposed in predetermined relation to bores 82' in the bumper plate portion 72' of the mounting beam 66' such that selective angular incremental rotation of the housing 90' relative to the mounting beam 66', as above described in respect to housing 90, will effect overlying registration of the tapped bore 268 with one of the bores 270 in the mounting beam 66'. In this fashion, a connecting screw 274 may be inserted upwardly through the bore 270 underlying the tapped bore 268 and threadedly secured within the tapped bore 268 to fixedly secure the housing 90' in its adjusted position on the mounting beam 66'. A suitable stop pin 276 is inserted into the bore 270a after the housing 90' is mounted on the mounting beam 66' and serves to prevent rotation of the housing 90' to a position where it could accidentally drop downwardly through the opening in the mounting beam 66'. In other respects, the shaker conveyor drive mechanism 18' of FIGS. 9 and 10 is substantially identical to the above described shaker conveyor drive mechanism 18 illustrated in FIGS. 1–7.

In accordance with the present invention, a drive mechanism means for a shaker conveyor is provided wherein the pull rod 20 undergoes motion in a plane substantially parallel to the direction of movement of the conveyor trough. This results in negligible forces from the pull rod 20 acting upwardly on the conveyor trough 12 transverse to its longitudinal axis, whereby to substantially reduce the creation of dust with its attendant contamination and environmental problems. The shaker conveyor drive mechanisms 18 and 18' undergo substantially less vibration than the shaker conveyor drive mechanisms heretofore available, with such reduced vibrational forces serving both to reduce wear, and thus prolong the life of the drive mechanisms, and contribute to reduced noise levels of the drive units. Additionally, by substantially filling the void areas within the drive mechanism 18 with oil, the noise level of the drive mechanism is reduced still further.

By providing a slide block 206 which has a cylindrical peripheral surface slidable in the cylindrical bore 204, binding and appreciable wear as heretofore encountered with square or rectangular shaped slide blocks is substantially eliminated. Any loading on the input crank arm 200a which tends to cause the input crank arm to deviate from a true parallel with the axis of rotation of the input crank 166 will create a tendency in the slide block to rotate about its longitudinal axis. By providing a cylindrical slide block 206, the slide block is allowed to rotate about its longitudinal axis to accommodate any such deviation of the input crank arm 200a from its true parallel relation with the axis of rotation of the input crank 166 without binding. In this manner, high stress points or areas which are normally created when square or rectangular slide blocks are subjected to forces tending to rotate them about their longitudinal axes are eliminated, with a corresponding reduction in wear. The ability of the cylindrical slide block 206 to accommodate deviation of the crank arm 200 from its true parallel relation to the axis of rotation of the output crank 166 provides a self-alignment feature of the slide block. It will be appreciated that the mounting beam 66 could be reversed end-for-end relative to its position shown in FIGS. 1 and 2 to reverse the direction of particle movement along the conveyor trough 12. Such adaptation would require releasable mounting of the mounting beam 66 on the frame means 14.

A further feature of the drive mechanisms 18 and 18' of the present invention lies in the fact that the housings 90 and 90' act as bearing sleeves for their output cranks 134, with the housings and bearing cranks being made by conventional machining techniques, such as on machine lathes. This differs substantially from the prior art shaker conveyor drive units which, in the majority, have employed welded fabricated housings.

While preferred embodiments of the invention have been illustrated and described, it will be obvious to those skilled in the art that changes and modifications may be made therein without departing from the invention in its broader aspects. Various features of the invention are defined in the following claims.

What is claimed is:

1. A shaker conveyor for conveying particles and the like, comprising, in combination, frame means, a conveyor trough, means supporting said conveyor trough on said frame means for reciprocating movement of said trough, and drive mechanism means operatively associated with said conveyor trough in a manner to effect said reciprocating movement thereof, said drive mechanism means including housing means defining a first longitudinal axis, input crank means rotatably supported by said housing means for rotation about an axis coincident with said first longitudinal axis, said input crank means having an input crank arm the axis of which is eccentric to said axis of rotation of said input crank means, output crank means rotatably supported by said housing means for rotation about an axis parallel and eccentric to said first longitudinal axis, said output crank means having an output crank arm the axis of which is parallel and eccentric to said axis of rotation of said output crank means, means for effecting rotation of said input crank means at a substantially constant rotational speed, means interconnecting said input crank arm to said output crank means including a cylindrical slide block carried by said input crank arm with the longitudinal axis of said slide block being substantially perpendicular to the longitudinal axis of said input crank arm, said slide block being cooperable with said output crank means in a manner to effect rotation of said output crank means at a predetermined variable angular velocity during each revolution thereof upon rotation of said input crank means, and means connecting said output crank arm to said conveyor trough to effect said reciprocating movement of said conveyor trough in a manner to cause particle movement therealong during rotation of said input crank means.

2. The shaker conveyor as defined in claim 1 wherein said conveyor trough includes a generally planar support surface along which particles are conveyed, said means connecting said output crank arm to said conveyor trough comprising a puller rod movable in a plane parallel to the plane of said generally planar support surface of said conveyor trough.

3. A shaker conveyor for conveying particles and the like, comprising, in combination, frame means, a conveyor trough, means supporting said conveyor trough on said frame means for reciprocating movement of said trough, and drive mechanism means operatively associated with said conveyor trough in a manner to effect said reciprocating movement thereof, said drive mechanism means including housing means defining a first longitudinal axis, input crank means rotatably supported by said housing means for rotation about an axis coincident with said first longitudinal axis, said input crank means having an input crank arm the axis of which is eccentric to said axis of rotation of said input crank means, output crank means rotatably supported by said housing means for rotation about an axis parallel and eccentric to said first longitudinal axis, said output crank means having an output crank arm the axis of which is parallel and eccentric to said axis of rotation of said output crank means, means for effecting rotation of said input crank means at a substantially constant rotational speed, means interconnecting said input crank arm to said output crank means in a manner to effect rotation of said output crank means at a predetermined variable angular velocity during each revolution thereof upon rotation of said input crank means, and means connecting said output crank arm to said conveyor trough to effect said reciprocating movement of said conveyor trough in a manner to cause particle movement therealong during rotation of said input crank means, said drive mechanism means including support beam means adapted to be positioned in fixed relation to said frame means, said housing means being mounted on said support beam means for selective rotation about its said first longitudinal axis relative to said support beam means in a manner to vary the velocity characteristics of movement of said conveyor trough during its said reciprocating movement.

4. The shaker conveyor as defined in claim 1 wherein said conveyor trough includes a substantially planar particle support surface and is movable in the longitudinal direction of said support surface, said first longitudinal axis and the axes of rotation of said input crank means and said output crank means being substantially normal to the plane of said planar support surface.

5. A shaker conveyor for conveying particles and the like, comprising, in combination, frame means, a conveyor trough supported by said frame means for reciprocating movement of said trough, and drive mechanism means operatively associated with said conveyor trough in a manner to effect said reciprocating movement thereof, said drive mechanism means including housing means defining a first longitudinal axis, input crank means rotatably supported by said housing means for rotation about an axis coincident with said first longitudinal axis, said input crank means having an input crank arm the axis of which is eccentric to said axis of rotation of said input crank means, output crank means rotatably supported by said housing means for rotation about an axis parallel and eccentric to said first longitudinal axis, said output crank means having an output crank arm the axis of which is parallel and eccentric to said axis of rotation of said output crank means, means for effecting rotation of said input crank means at a substantially constant rotational speed, means interconnecting said input crank arm to said output crank means in a manner to effect rotation of said output crank means at a predetermined variable angular velocity during each revolution thereof upon rotation of said input crank means, and means connecting said output crank arm to said conveyor trough to effect said reciprocating movement of said conveyor trough in a manner to cause particle movement therealong during rotation of said input crank means, said housing means having an outer cylindrical bearing surface the axis of which defines said first longitudinal axis, said input crank means having a bearing surface slidable on said housing bearing surface during rotation of said input crank means about said first longitudinal axis, said housing means having a chamber formed therein adapted to receive said output crank means therein, and including bearing means disposed between said housing means and said output crank means to facilitate rotation of said output crank means about its said axis of rotation, said output crank means having a transverse bore therein provided with an access opening, said input crank arm extending through said access opening into said transverse bore, said means interconnecting said input crank arm to said output crank means comprising a slide block disposed within said transverse bore and cooperable with said input crank arm and said output crank means in a manner to transmit rotational motion to said output crank means upon rotation of said input crank means.

6. The shaker conveyor as defined in claim 5 wherein said rotational motion transmitted to said output crank means is effected by a force vector acting in a plane substantially normal to said first longitudinal axis, and wherein said bearing means comprises a pair of annular bearings which lie in planes disposed parallel to and spaced on opposite sides of said plane containing said force vector.

7. A shaker conveyor drive comprising housing means, input crank means supported by said housing means for rotation about a first axis, output crank means supported by said housing means for rotation about a second axis parallel to and spaced from said first axis, said output crank means having an output crank arm the axis of which is parallel and eccentric to said second axis, said output crank means having a bore therein the axis of which is normal to and intersects said second axis, said output crank means having an access opening intersecting said bore, said input crank means having an input crank arm extending within said bore through said access opening, slide block means disposed within said bore and interconnecting said input crank arm to said output crank means such that driving rotation of said input crank means effects a predetermined variable angular velocity of said output crank means during each revolution thereof about said second axis.

8. A shake conveyor drive as defined in claim 7 wherein said housing means has an outer cylindrical surface the axis of which defines said first axis, said input crank means having a substantially annular wall coaxial with said outer cylindrical surface, said housing means having a chamber formed therein adapted to receive said output crank means therein, and including bearing means disposed between said housing means and said output crank means to facilitate rotation of said output crank means about said second axis.

9. A shaker conveyor drive as defined in claim 8 wherein the rotational motion transmitted to said output crank means from said input crank means is effected by a force including a force vector acting in a plane substantially normal to said first axis, and wherein said bearing means comprises a pair of annular bearings which lie in planes disposed parallel to and spaced on opposite sides of said plane containing said force vector.

10. A shaker conveyor drive as defined in claim 8 wherein said outer cylindrical surface comprises a bearing surface, said annular wall of said input crank means having an internal annular bearing surface slidable on said cylindrical bearing surface during rotation of said input crank means.

11. The shaker conveyor drive defined in claim 7 wherein said slide block is cylindrical and has a transverse bore adapted to receive said input crank arm therein with the axis of said input crank arm being substantially normal to and intersecting the longitudinal axis of said cylindrical slide block.

12. The shaker conveyor drive defined in claim 8 wherein said housing means, said input crank means and said output crank means cooperate to define a sealed chamber; said bearing means, said transverse bore in said output crank means and said slide block are disposed within said sealed chamber; said output crank means defines lubricating flow passage means therein; and a lubricating fluid is disposed within said sealed chamber, said slide block being cooperable with said output crank means to effect circulation of said lubricating fluid within said sealed chamber during rotation of said input crank means.

13. The shaker conveyor drive defined in claim 9 wherein said input crank means includes an annular drive connection means concentric with its said annular wall, said drive connection means lying in a plane disposed intermediate said planes of said annular bearings and substantially parallel thereto.

14. The shaker conveyor drive of claim 13 wherein said annular drive connection means comprises a sheave.

15. A shaker conveyor drive as defined in claim 7 including support beam means defining a beam axis and adapted to support said housing means for selective rotation about said first axis relative to said beam axis, rotation of said input crank means effecting a first predetermined variable angular velocity characteristic of said output crank means when said housing means is positioned on said support beam means such that a plane containing said first and second axes also contains said beam axis, rotation of said housing means relative to said support beam axis serving to vary the angular velocity characteristics of said output crank means relative to said first velocity characteristic during each revolution of said output crank means.

16. A shaker conveyor drive as defined in claim 15 wherein said housing means is supported by said support beam means such that said first axis is normal said beam axis.

17. A shaker conveyor drive as defined in claim 8 wherein said bearing means support said output crank means on said housing means, and including support plate means secured to said output crank means and cooperable with said input crank means in supporting relation therewith.

18. A shaker conveyor drive comprising mounting beam means defining a longitudinal axis and having an opening therein, housing means received within said opening and being supported by said mounting beam means for selective rotation about a first axis relative to said mounting beam means, output crank means supported by said housing means for rotation about a second axis parallel to and spaced from said first axis, input crank means supported by said housing means and operatively connected to said output crank means in a manner to effect a predetermined variable angular velocity characteristic of said output crank means during each revolution thereof about said second axis upon driving rotation of said input crank means with said housing means disposed in a first position relative to said mounting beam means, said housing means being rotatable relative to said mounting beam means in a manner to vary said variable angular velocity characteristic, and means for releasably securing said housing means to said mounting beam means for maintaining said housing means in a selected position relative to said mounting beam means.

19. A shaker conveyor drive as defined in claim 18 wherein said means for releasably securing said housing means to said mounting beam means includes holddown clamp means releasably connectible to said mounting beam means and cooperable with said housing means in a manner to secure said housing means in fixed relation on said mounting beam means.

* * * * *